United States Patent
Hehl

(10) Patent No.: US 6,361,303 B1
(45) Date of Patent: Mar. 26, 2002

(54) MOULD-CLOSING UNIT FOR AN INJECTION MOULDING MACHINE

(76) Inventor: Karl Hehl, Arthur-Hehl-Str. 32, D-72290 Lossburg (DE)

(*) Notice: Subject to any disclaimer, the term of this patent is extended or adjusted under 35 U.S.C. 154(b) by 0 days.

(21) Appl. No.: 09/529,366

(22) PCT Filed: Oct. 7, 1998

(86) PCT No.: PCT/EP98/06371

§ 371 Date: Apr. 12, 2000

§ 102(e) Date: Apr. 12, 2000

(87) PCT Pub. No.: WO99/19130

PCT Pub. Date: Apr. 22, 1999

(30) Foreign Application Priority Data

Oct. 13, 1997 (DE) .......................................... 197 44 986

(51) Int. Cl.[7] .............................................. B29C 45/64
(52) U.S. Cl. ...................... 425/190; 425/589; 425/595
(58) Field of Search .................. 425/190, 192 R, 425/589, 595

(56) References Cited

U.S. PATENT DOCUMENTS

| | | | | | |
|---|---|---|---|---|---|
| 4,105,385 A | * | 8/1978 | Hehl | ........................ | 425/589 |
| 4,380,427 A | * | 4/1983 | Hehl | ........................ | 425/590 |
| 4,846,664 A | * | 7/1989 | Hehl | ........................ | 425/589 |
| 5,547,366 A | * | 8/1996 | Hehl | ........................ | 425/589 |

FOREIGN PATENT DOCUMENTS

| | | |
|---|---|---|
| DE | 43 40 693 C2 | 6/1995 |
| DE | 196 16 452 | 11/1996 |
| EP | 0 655 309 A | 5/1995 |
| FR | 2 147 425 A | 3/1973 |

* cited by examiner

Primary Examiner—James P. Mackey
(74) Attorney, Agent, or Firm—Cantor Colburn LLP

(57) ABSTRACT

A mold-closing unit for an injection molding machine for processing plasticizable masses includes a support element for supporting a piston-cylinder unit for moving a mobile mold carrier and to support a pressure cylinder, and a hydraulic block to supply hydraulic lines inside the support element. The support element has at least two support sections which accommodate between them the hydraulic block and are connected to the hydraulic block via a fastener. Thus the mold-closing unit can be constructed more compactly, with shortening of the bores for the hydraulic lines.

8 Claims, 5 Drawing Sheets

MOULD-CLOSING UNIT FOR AN INJECTION MOULDING MACHINE

TECHNICAL FIELD

The invention relates to a mold-closing unit for an injection molding machine for processing plastics materials and other plasticizable masses such as e.g. plastics materials, powdery masses or ceramic masses.

BACKGROUND OF THE INVENTION

A mold-closing unit of this kind is known from DE 43 40 693 C2 and serves substantially to move the mobile mold carrier towards the stationary mold carrier in order thereby to close the mold. Apart from the piston-cylinder unit necessary for this movement, two pressure cylinders are also provided there to build up the locking pressure during the injection process. In order to render possible a central arrangement of the hydraulic block, without additional lines having to be led to the individual consumers, the support element for the mold-closing unit is inserted there simultaneously as a distributor for the hydraulic medium. In order, however, not to disrupt there the support effect of the support element, there is allocated to the support element a separate hydraulic block which is disposed on the support element. In order, therefore, to make distribution of the hydraulic medium possible, comparatively long bores are necessary inside the support element.

SUMMARY OF THE INVENTION

Proceeding from this prior art, the object underlying the present invention is to develop a mold-closing unit of the type mentioned initially in such a way that a more compact construction of the mold-closing unit is realized with shortening of the bores for the hydraulic lines.

This object is achieved by a mold-closing unit with the features of claim 1.

Now the support element of the mold-closing unit consists of a plurality of support sections which accommodate the hydraulic block between them. In order to achieve nevertheless a certain inner stability, the support sections and the hydraulic block are connected to one another via fastening means. The support sections themselves can be configured more simply in that only functional bores, i.e. bores which are actually required for the transmission of hydraulic medium, have to be introduced since, as a result of the smaller dimensions, correspondingly precise bores can also be bored from one side only. With the arrangement of the hydraulic block between the two support sections, not only can flexible lines be dispensed with, but the latter can also be shortened; both of these being advantages which have a positive effect on the control of the mold-closing unit. The break-up of the previous support element, however, also makes possible the use of different materials for the more severely loaded support sections and the generally less stressed hydraulic block. The materials can, therefore, be paired with one another from the viewpoints of simplification of manufacture and of static dimensioning. Simultaneously, through this distribution, the pre-requisites for increased modularity are created using one and the same hydraulic distributor in conjunction with support sections of the most varied kind.

If the support sections, in an embodiment according to claim 3, are designed symmetrically, this also contributes to increasing modularity, since identically constructed simple parts can be exchanged as necessary. Simultaneously the transporting of replacement parts is made simpler even to distant countries.

In an embodiment according to claims 4 and 5, a flow of force arises such that forces are substantially transmitted inside the respective connecting section, without there being any more serious stressing in the region of the hydraulic block on which forces impinge possibly in an embodiment of the balancing cylinder according to claim 8.

The desired modularity can, in an embodiment according to claim 6, be further increased in that the hydraulic block has at its disposal connecting regions which co-operate with connecting regions of the connecting sections, the appearance of the connecting sections in other respects being unimportant. Thus the hydraulic block fits with any connecting section insofar as the latter only has the suitable connecting region, which both reduces costs of production and also contributes to reducing storage at the manufacturers in respect of the hydraulic block.

DETAILED DESCRIPTION OF PREFERRED EMBODIMENTS

The invention is now explained in greater detail, by way of example, with reference to the attached drawings. However the embodiments are only examples which are not intended to limit the inventive idea to a specific physical arrangement.

Figure 1:
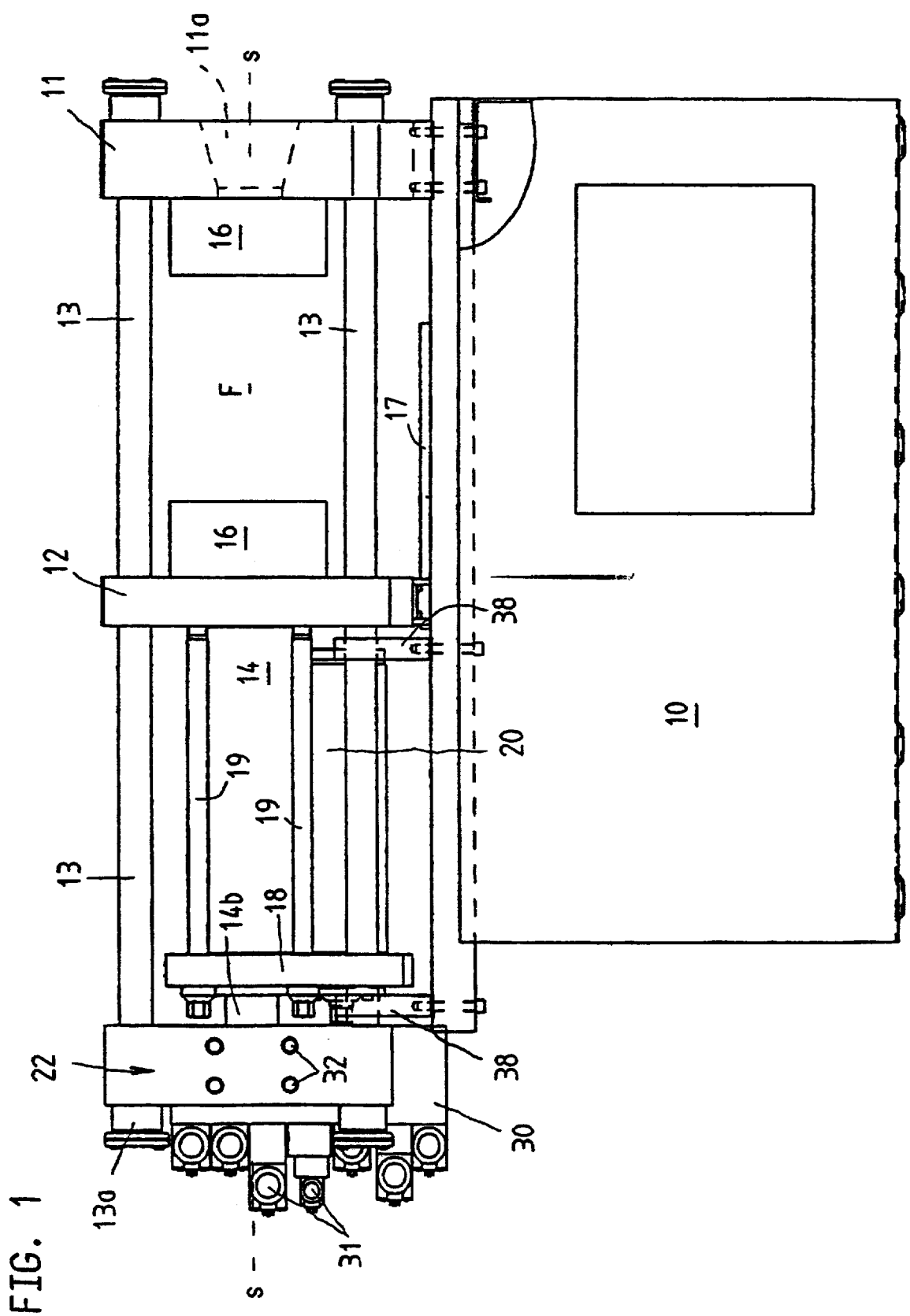
FIG. 1 a side view of the mold-closing unit disposed on a machine base.

FIG. 1 shows the mold-closing unit located on a machine base 10. The mold-closing unit comprises a stationary mold carrier 11, a mobile mold carrier 12 and a support element 22 which, in the present case, are connected via fastening means to the machine base. Mobile mold carrier 12 and stationary mold carrier 11 form between them a mold tentering space F to accommodate a mold 16. Via a recess 11a in the stationary mold carrier 11, a plasticizable mass, such as e.g. plastics material or a powdery or ceramic mass can be injected into the closed mold 16 from an injection molding unit which is not shown in the drawings.

Support element 22, mobile mold carrier 12 and stationary mold carrier 11 are penetrated by bars 13, which preferably serve to guide a movement unit B (FIG. 2) incorporating the mobile mold carrier 12. During the movement of the mobile mold carrier 12 in and out of the closed position of the mold, the mold carrier is in addition guided on a guideway 17. Instead of the bars 13, there is in principle also the possibility of providing, in a known manner, force transmission elements in the form of a C-strap, which guide the forces occurring as the mold is closed and the locking force is applied, around the mold tentering space F. In this case, the bridge 38, which here supports the mold-closing unit on the machine base, is then also designed in such a way that, if possible, no forces are transmitted into the machine base 10 from the mold-closing unit.

Figure 2:
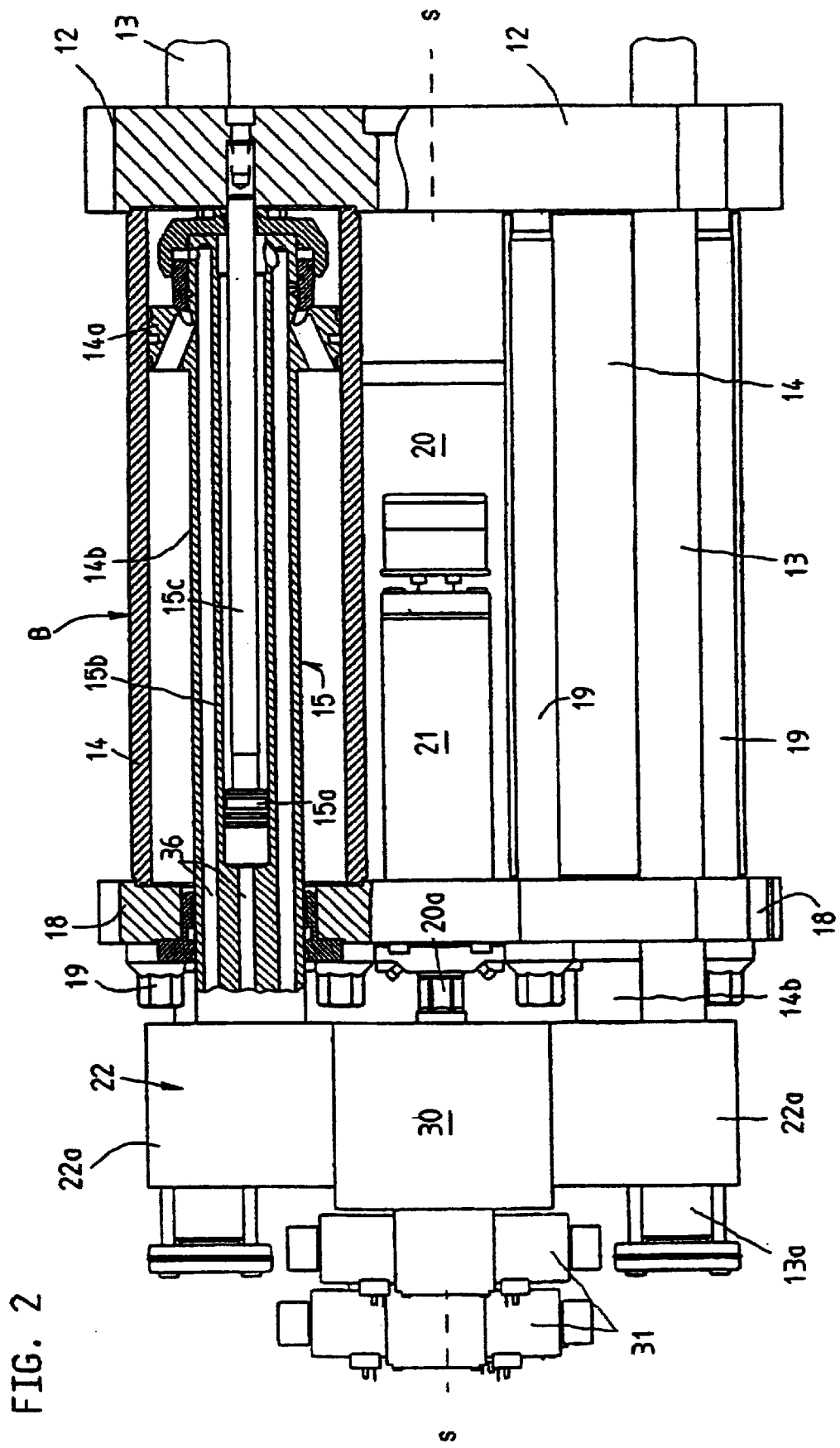
FIG. 2 a plan view, partially in section, of support element and mobile mold carrier, FIG. 3 an enlarged detail, partially in section, from FIG. 3 in the region of the support element, FIG. 4 a view of the support element according to FIG. 1, from the left, FIG. 5 a view of the mold-closing unit according to FIG. 1 from the left and with support section swung out.

FIG. 2 makes clear that at least one pressure cylinder 14, in this embodiment two pressure cylinders with pressure piss ton 14a at the end of a piston rod 14b, are provided to build up the locking pressure. Furthermore, at least one piston-cylinder unit 15 is provided which is responsible for the closing movement, i.e. for the movement of the mobile mold carrier 11 in and out of the closed position of the mold 16 in the mold tentering space F. In this embodiment, respectively two bars 13 and the piston rod 14b of the pressure piston 14a, which rod simultaneously forms the moving cylinder 15b of the piston-cylinder unit, are connected to the support element 22 and thus to the two—there can also be more than two—support sections 22a, whilst the pressure cylinder 14 and the piston rod 15c with piston 15a of the piston-cylinder unit 15 are connected to the mobile mold carrier 12. Naturally other arrangements are also possible in which moving cylinder 15b and piston rod 14b are not identical to one another and/or are coaxial to one another. Pressure cylinders 14 are closed at the rear via a cylinder cover 18 which is braced via tension rods 19 with the mobile mold carrier 12, such that mobile mold carrier 12, pressure cylinder 14 and cylinder cover 18 form a movement unit B. This is moreover together with the functioning of the mold-closing unit shown here, the subject matter of DE 43 40 693 C2.

Support element 22 serves to support both the pistoncylinder unit 15 and also one of the parts of pressure piston 14a or pressure cylinder 14. To this extent, the arrangement of piston and cylinder is not significant such that their arrangement can basically also be reversed. However, advantageously an arrangement such as is represented in FIG. 2 is preferred, in which the moving cylinder 15b is disposed coaxially to and in the piston rod 14b. There is allocated to support element 22 a hydraulic block 30 to supply hydraulic lines 37 inside the support element 22. Support element 22 has at least two support sections 22a, which accommodate the hydraulic block 30 between them. In order to guarantee reliable support, in this embodiment these support sections are connected via fastening means 32 to the hydraulic block 30, centering bushes 33 being provided in the transitional region between hydraulic block 30 and support section 22a. This central arrangement between the support sections 22a contributes to shortening the line length and also to minimizing the outlay for manufacturing the hydraulic lines inside the support segments 22a. In principle, what is intended to be achieved by this is that no flexible lines are necessary and yet, nevertheless, the forces can be reliably transmitted via the support sections. If however the flow of force is in fact substantially led via the support sections, less importance can be attached to the type of fastening between hydraulic block 30 and support section 22a, although, even then, care should be taken to avoid flexible lines, which basically contribute to impairing the control accuracy of the mold-closing unit.

Figure 3:
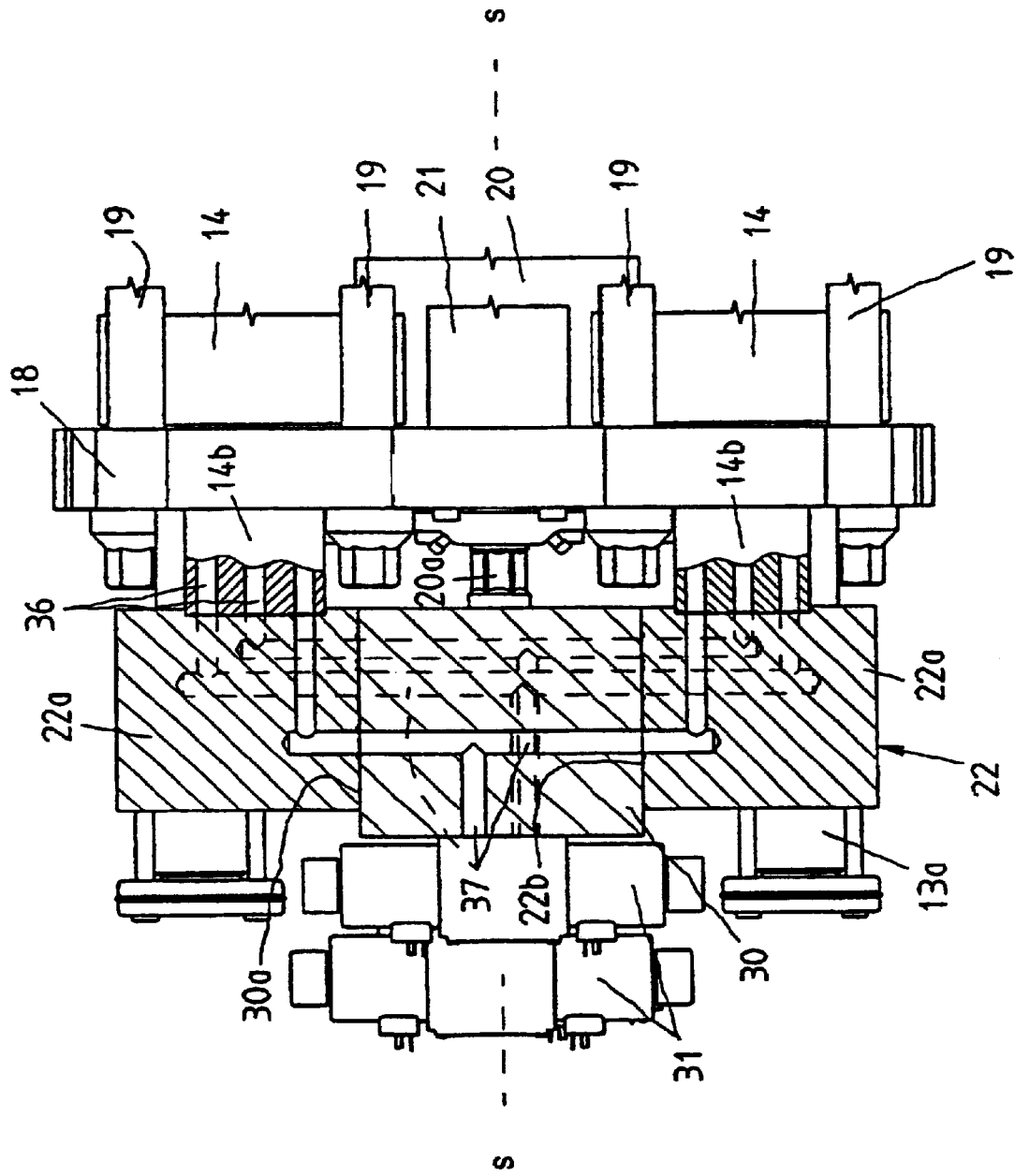
Figure 4:
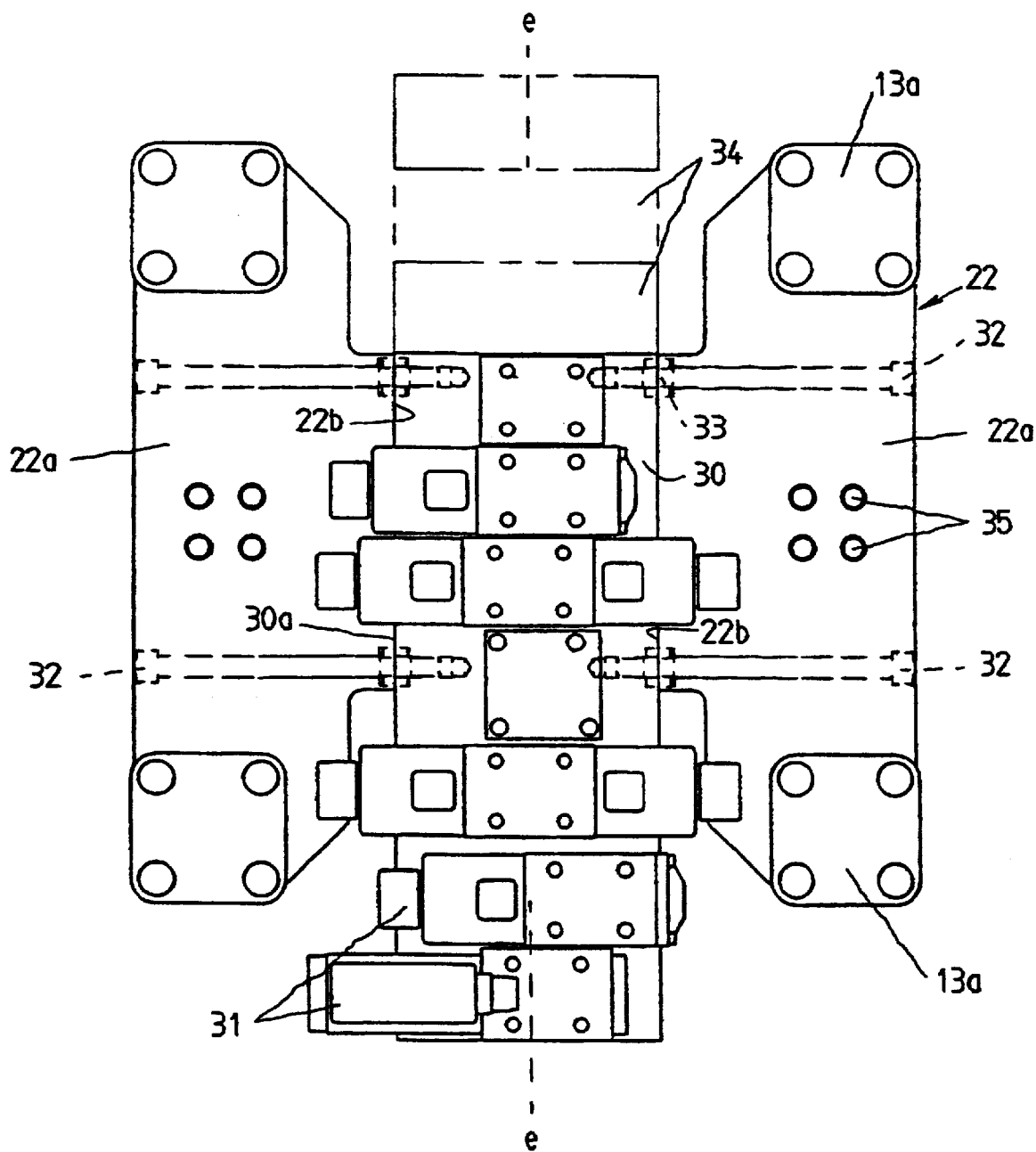

According to FIGS. 3 and 4, the support sections 22a are disposed symmetrically to a vertical plane e-e laid through the closing axis s-s. Preferably, the hydraulic lines 37 are also symmetrical to this plane (FIG. 3). There is allocated to each support section 22a a pressure cylinder 14 and a piston-cylinder unit 15, arrangements being also possible here in which e.g. respectively a pressure cylinder is associated with each of respectively two of four support sections 22a and a piston-cylinder unit 15 is associated with the other two support sections 22a. In this embodiment, each of the two support section 22a is connected to two bars 13 and the piston rod 14b of the pressure piston 14a, which rod is simultaneously the moving cylinder 15b of the pistoncylinder unit 15. This arrangement contributes to enabling the flow of force to be kept substantially inside the individual support section on the left and the right of the hydraulic block 30. The hydraulic block 30 is therefore only subject to stress from the balancing piston-cylinder unit 20 disposed below the pressure cylinders 14. According to FIG. 4, the hydraulic block 30 has on both sides connecting regions 30a, at which it is connected to corresponding connecting regions 22b of the support sections 22a. If these connecting regions are matched to one another, the appearance of the supporting sections 22a in other respects is unimportant, such that one and the same hydraulic block can be used in machines of different sizes, which contributes to an increase in the modular construction just as much as the identical and simple design of the two support sections 22a themselves. Connecting region 22b is located roughly at the level of the center between the two bars 13 which abut via supports 13a against the support sections 22a. The length of this connecting region 22b in a vertical direction is less than two-thirds of the spacing between the centers of the bars 13. Thus it is possible to provide in the region above the connecting regions space for additional hydraulic blocks 34, if e.g. additional functions such as core pullers are to be provided. The view according to FIG. 4 clarifies moreover the arrangement of the hydraulic circuit elements 31 behind the hydraulic block 30.

Figure 5:
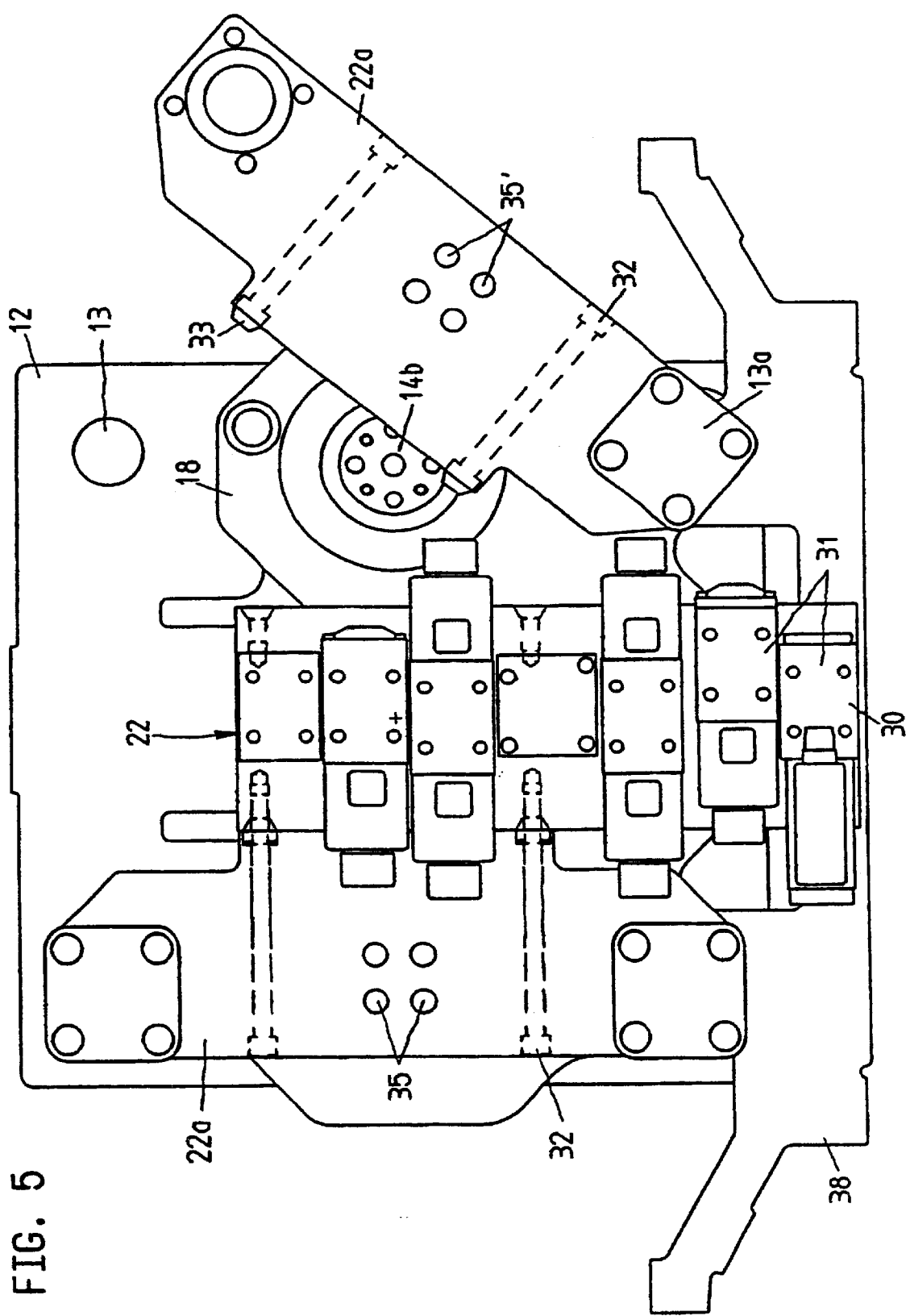

In principle, leakages can also occur between hydraulic block 30 and support sections 22a. In order to guarantee easier access here in the case of maintenance, the support section 22a can, however, be pivoted around a bar 13 as pivot axis, as shown in FIG. 5. For this purpose, it is necessary to detach the piston rod fastenings 35 of piston rod 14b and remove them from bores 35' (FIG. 5). In addition, the upper bar 13 must be pulled back such that with corresponding slackening in the region of the lower bar, swiveling out is made possible.

It goes without saying that this specification can be subjected to the most varied modifications, alterations and adaptations which move in the region of equivalents to the appended claims.

What is claimed is:

1. A mold-closing unit for an injection molding machine for processing plastics materials and other plasticizable masses, comprising:
    a stationary mold carrier and a mobile mold carrier which form between them a mold tentering space;
    at least one pressure cylinder with a pressure piston and a piston rod to build up a mold locking pressure;
    at least one piston-cylinder unit to move the mobile mold carrier in and out of a closed position of a mold in the mold tentering space;
    at least one support element to support the piston-cylinder unit and piston rod or pressure cylinder, hydraulic lines being provided in the support element; and
    a hydraulic block, allocated to the support element, to supply the hydraulic lines with hydraulic medium,
        wherein the support element has at least two support sections which accommodate between them the hydraulic block and are connected to the hydraulic block via fastening means.

2. The mold-closing unit according to claim 1, wherein the support sections are penetrated by at least two bars, which simultaneously serve as guides for a movement unit incorporating the mobile mold carrier.

3. The mold-closing unit according to claim 1, wherein the support sections are disposed symmetrically to a vertical plane laid through a closing axis, the hydraulic lines being disposed symmetrically to the vertical plane.

4. The mold-closing unit according to claim 1, wherein there is allocated to each support section a pressure cylinder and/or a piston-cylinder unit.

5. The mold-closing unit according to claim 4, wherein said at least two bars and the piston rod of the pressure piston are connected to each of the two support sections, the piston rod forming simultaneously a moving cylinder of the piston-cylinder unit, the moving cylinder being disposed coaxially to and within the piston rod.

6. The mold-closing unit according to claim 2, wherein the hydraulic block has on both sides connecting regions which co-operate with corresponding connecting regions of the support sections.

7. The mold-closing unit according to claim 6, wherein the connecting region of the support sections is disposed roughly at a level of a center between the two bars per side of the mold-closing unit and a length of the connecting region in a vertical direction amounts to less than two-thirds of a spacing between the centers of the bars.

8. The mold-closing unit according to claim 1, wherein the support sections may be swiveled out for maintenance purposes, using a bar as the pivot axis.

* * * * *

UNITED STATES PATENT AND TRADEMARK OFFICE
CERTIFICATE OF CORRECTION

PATENT NO.   : 6,361,303 B1                                          Page 1 of 1
DATED        : March 26, 2002
INVENTOR(S)  : Hehl It is certified that error appears in the above-identified patent and that said Letters Patent is hereby corrected as shown below:

Column 2,
Line 67, after "pressure" (second occurrence), delete "piss" and insert therefor -- pis- --.

Column 3,
Line 23, after "both the" delete "pistoncyl-" and insert therefor -- piston cyl- --.
Line 62, after "of the" delete "pistoncylin-" and insert therefor -- piston cylin- --.

Signed and Sealed this

Twentieth Day of September, 2005

JON W. DUDAS
*Director of the United States Patent and Trademark Office*